Sept. 20, 1971   R. J. WALEWSKI   3,605,295
STONE GUARD FOR ELEVATOR SCRAPERS
Filed July 7, 1969   2 Sheets-Sheet 1
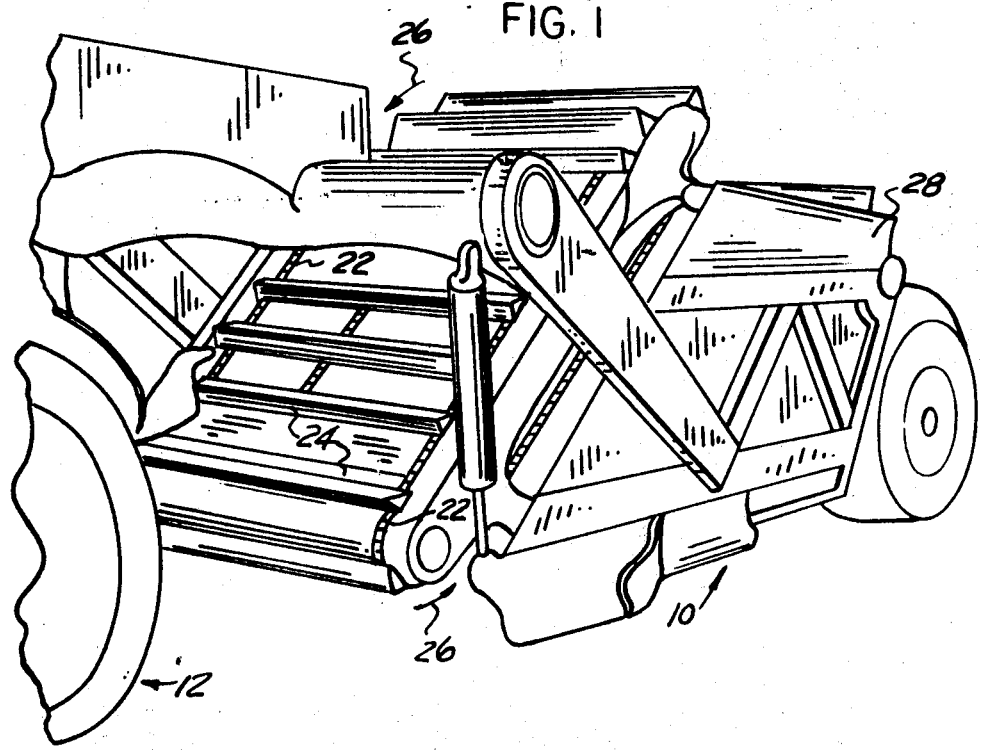
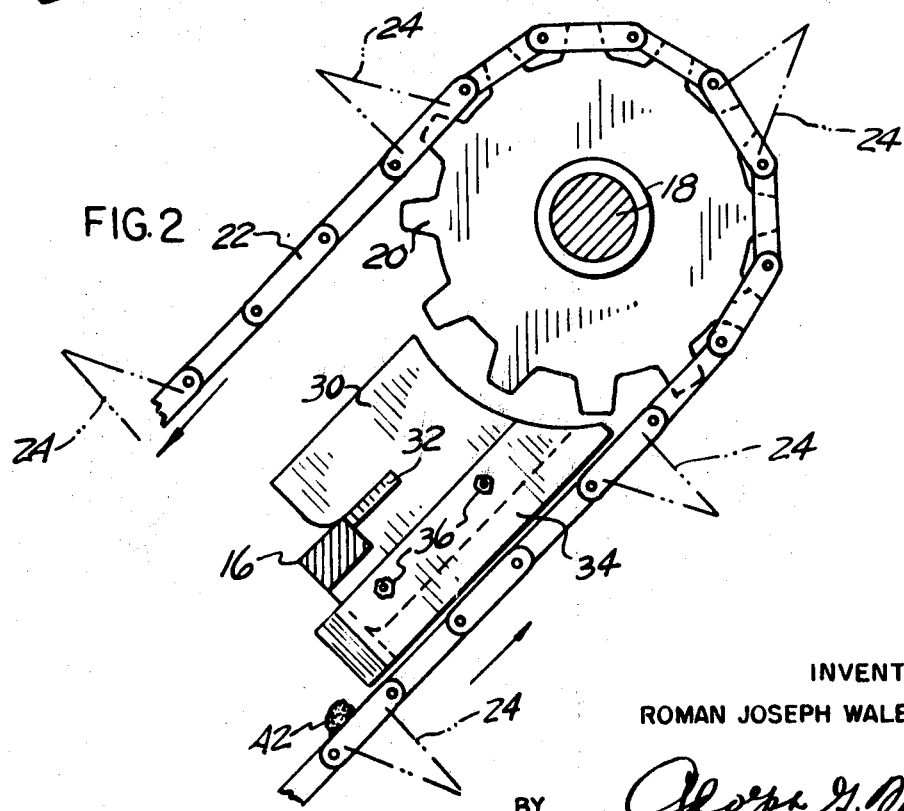
INVENTOR
ROMAN JOSEPH WALEWSKI
BY
ATTORNEY Sept. 20, 1971    R. J. WALEWSKI    3,605,295
STONE GUARD FOR ELEVATOR SCRAPERS
Filed July 7, 1969    2 Sheets-Sheet 2

INVENTOR
ROMAN JOSEPH WALEWSKI
BY *Adolph G. Martin*
ATTORNEY

# United States Patent Office 3,605,295
Patented Sept. 20, 1971

3,605,295
STONE GUARD FOR ELEVATOR SCRAPERS
Roman Joseph Walewski, 32631 Alvin St.,
Garden City, Mich. 48135
Filed July 7, 1969, Ser. No. 839,200
Int. Cl. B60p 1/36
U.S. Cl. 37—8                               2 Claims

ABSTRACT OF THE DISCLOSURE

A guard for preventing damage to the endless chains and driving sprockets on elevator scrapers by rocks and stones. The guard consists of a vertically disposed plate aligned with each of the sprockets and having a replaceable wear shoe on the lower side in sliding engagement with its associated endless chain when the scraper is in operation. A deflector point on the forward end of each wear shoe diverts rocks and stones from the endless chains so as to prevent them from reaching the sprockets and damaging the chains.

BACKGROUND OF THE INVENTION

This invention relates to elevator scrapers generally, and more particularly to a guard for protecting the endless chains thereon from damage by rocks and stones. The chains on scrapers presently in use, are regularly ruptured and forced out of synchronism by solids which become trapped between the sprockets and chains. To prevent such damage to elevator scrapers when operating on rocky soils, the applicant has devised a guard which diverts and deflects rocks and stone from the endless chains before they reach the sprockets.

SUMMARY OF THE INVENTION

This invention comprises a plate 30 which is vertically supported by the frame members 14 and cross supports 16 on the elevator scraper 10. A wear shoe 34, removably attached to the lower side of the plate 30, has an L shaped cross section and deflector point 38 on the forward end. A support bar 40, seated on the lateral portion of the wear shoe 34, is drawn into contact with the plate 30 by bolts 36, which simultaneously forces the other side of the plate into engagement with the upright portion of the wear shoe 34.

BRIEF DESCRIPTION OF THE DRAWINGS

FIG. 1 is a front perspective view of an elevator scraper 10, showing the endless link chains 22 and the interconnecting paddles 24.

FIG. 2 is an enlarged view of the applicant's guard mounted on an elevator scraper 10, showing its location relative to the sprockets 20 and endless link chains 22.

CONSTRUCTION

Figures 4, 5:
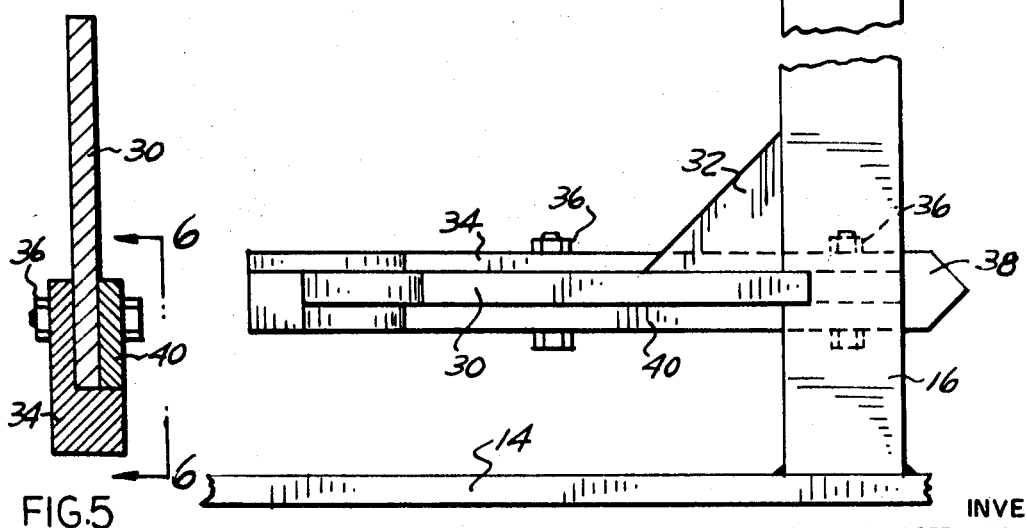
FIG. 4 is an enlarged top fragmentary view, showing the applicant's guards mounted on a cross support 16 between the side frame members 14 of an elevator scraper 10.
FIG. 5 is a section view, taken substantially on plane 5—5 in FIG. 3, showing the structural details of the wear shoe 34.

For a more detailed description of the invention, reference is made to the drawings in which numeral 10 designates an elevator scraper detachably connected to a tractor 12. The scraper comprises the customary chassis having side frame members 14, and cross supports 16 as shown in FIG. 4. A drive shaft 18, supported by the frame members 14, carries a pair of sprockets 20, each driveably engaged with an endless link chain 22, as shown in FIG. 2.

Spaced transverse paddles 24 are attached to the link chains 22 for movement as shown by the arrows 26 in FIGS. 1 and 2. A collector bowl 28, on the chassis of the elevator scraper 10, is located below the transverse paddles 24. A vertically disposed plate 30 is attached to the cross support 16 in alignment with each of the sprockets 20 on the drive shaft 18. Triangular gussets 32 are placed between the plates 30 and the cross support 16 on which they are mounted.

Figure 3:
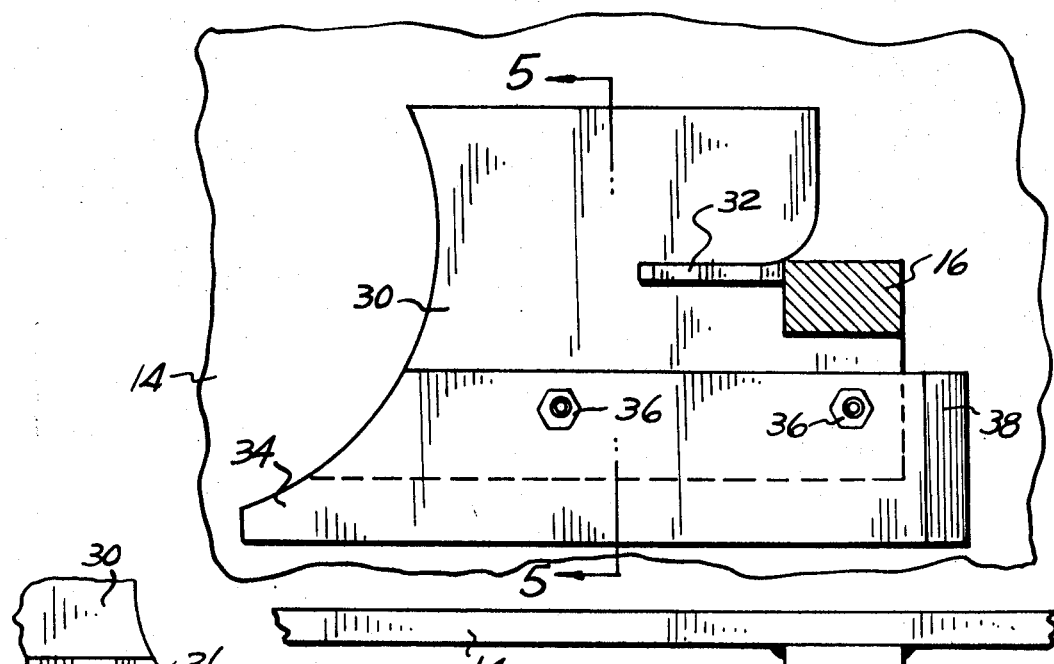
FIG. 3 is an enlarged elevation view of the applicant's guard showing structural details of the wear shoe 34 and plate 30.
Figure 6:
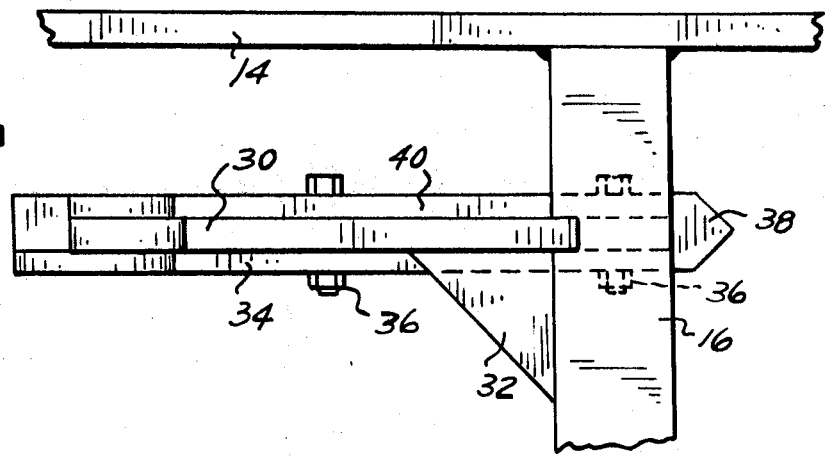
FIG. 6 is an elevational view, taken substantially on plane 6—6 in FIG. 5, showing the characteristic shape of the support bar 40.

A wear shoe 34, having an L shaped cross section as shown in FIG. 5, is removably attached to the lower edge of each plate 30 by bolts 36. A deflector point 38 is provided on the forward end of each wear shoe 34, as shown in FIGS. 3 and 4. A support bar 40, seated on the lateral portion of the wear shoe 34, is held in bearing engagement with the plate 30 by the bolts 36.

The preceding discussion completes a description of the structural details relating to the applicant's invention herein disclosed. However, to facilitate a more thorough and comprehensive understanding of the subject matter, a discussion is immediately hereinafter directed to the manner in which the device operates to accomplish its intended function.

OPERATION

In operation, the L shaped wear shoe 34 is in sliding engagement with the lower segment of the endless link chain 22 with which it is associated. Consequently, any rocks or other solids 42, as shown in FIG. 2, which reach the deflector point 38 on the wear shoe 34, are diverted and prevented from becoming entrapped between the sprocket 20 and the endless link chain 22. The applicant's guard is thus able to avoid regular and costly damage to the elevator scraper 10 when it is operating on rocky soils.

Based upon the foregoing discussion, the applicant is of the opinion that his invention has fulfilled a long-felt need in the field of earth moving equipment, and that he has accordingly made a valuable contribution to the related art. However, while the invention has described with reference to the structural details of a single embodiment, it will be appreciated by those familiar with the art, that the principles involved are susceptible of numerous other practical adaptations.

I therefore claim as new, and desire to secure by Letters Patent:

1. In an elevator scraper having a frame, cross supports on the frame, a drive shaft supported by the frame, a pair of spaced sprockets on the drive shaft, an endless link chain driveably engaged on each of the sprockets, and transverse paddles connected between the endless link chains, a guard for protecting the endless link chains comprising a vertically disposed plate aligned with each of the sprockets and supported by a cross support of the frame, an elongated wear shoe having an L shaped cross section attached to the lower side of each vertically disposed plate, such wear shoe entering into sliding engagement with the lower segment of the endless link chain with which it is associated when the elevator scraper is in operation thereby preventing solids from reaching the sprockets and damaging the endless link chains, and a deflector point on the forward end of each elongated wear shoe to assist in diverting solids from the endless link chain.

2. In an elevator scraper having a frame, cross supports on the frame, a drive shaft supported by the frame, a pair of spaced sprockets on the drive shaft, an endless link chain driveably engaged on each of the sprockets, and transverse paddles connected between the endless link chains, a guard for protecting the endless link comprising a vertically disposed plate aligned with each of the sprockets and supported by a cross support of the frame, an elongated wear shoe having an L shaped cross section attached to the lower side of each vertically disposed plate, such wear shoe entering into sliding engagement with the lower segment of the endless link chain with which it is associated when the elevator scraper is in operation thereby preventing solids from reaching the sprockets and damaging the endless link chains, a deflector point on the forward end of each elongated wear shoe to assist in diverting solids from the endless link chain, a support bar seated on the lateral portion of the elongated wear shoe, and means for drawing the support bar into contact with one side of the vertically disposed plate and simultaneously forcing the other side of such plate into intimate bearing engagement with the upright portion of the elongated wear shoe.

References Cited

UNITED STATES PATENTS

| | | | |
|---|---|---|---|
| 577,503 | 2/1897 | Ash | 74—230 |
| 936,887 | 10/1909 | Healey | 74—230 |
| 1,263,658 | 4/1918 | Fitzsimons | 37—8 |
| 1,477,776 | 12/1923 | Shedenhelm | 37—8 |
| 2,779,045 | 1/1957 | Harvey | 15—256.5X |
| 3,504,786 | 4/1970 | Matson | 74—230 |

CLYDE I. COUGHENOUR, Primary Examiner

U.S. Cl. X.R.

15—256.5; 74—230; 198—168